United States Patent [19]

Winik

[11] Patent Number: 4,989,215
[45] Date of Patent: Jan. 29, 1991

[54] LASER PUMPING CAVITY

[75] Inventor: Michael Winik, Mskeret Batia, Israel

[73] Assignee: El-Op Electro-Optics Industries Ltd., Rehovot, Israel

[21] Appl. No.: 304,463

[22] Filed: Feb. 1, 1989

[30] Foreign Application Priority Data

Aug. 8, 1988 [IL] Israel .................................. 087370

[51] Int. Cl.$^5$ ............................................. H01S 3/091
[52] U.S. Cl. ...................................... 372/70; 372/72; 372/80; 372/99
[58] Field of Search .................... 372/72, 80, 70, 99; 252/301.16, 301.18

[56] References Cited

U.S. PATENT DOCUMENTS

| 3,353,115 | 11/1967 | Maiman | 372/70 |
| 3,504,297 | 3/1970 | Baugh et al. | 372/80 |
| 3,555,449 | 11/1970 | Osial et al. | 372/72 |
| 3,582,816 | 6/1971 | Waszak et al. | 372/72 |
| 3,611,189 | 11/1971 | Stone et al. | 372/72 |
| 3,979,696 | 9/1976 | Buchman | 372/72 |
| 4,096,450 | 6/1978 | Hill et al. | 372/72 |
| 4,445,217 | 4/1984 | Acharekar et al. | 372/35 |
| 4,641,315 | 2/1987 | Draggoo | 372/72 |
| 4,734,917 | 3/1988 | Johnson | 372/70 |
| 4,769,823 | 9/1988 | Dubé | 372/80 |

Primary Examiner—Frank Gonzalez
Attorney, Agent, or Firm—Fleit, Jacobson, Cohn, Price, Holman & Stern

[57] ABSTRACT

A diffusely reflective fluorescent powder used in a laser pumping cavity directs light onto a laser rod and in addition increases the spectral overlap between a pump source and a laser material. Undesirable ultra-violet radiation, which is a substantial fraction of the pump spectrum is converted into useful longer wavelength radiation thereby increasing the laser energy output. The invention further relates to a method of increasing the energy output of lasers and of laser amplifiers.

7 Claims, 4 Drawing Sheets

LASER PUMPING CAVITY

FIELD OF THE INVENTION

The invention relates to lasers, and more particularly to a laser pumping cavity for efficient optical pumping of lasers. The invention is applicable to solid state lasers, dye lasers, laser amplifiers and in general to any apparatus for efficient excitation of active medium for generation or amplification of infra-red, visible or ultra-violet waves.

BACKGROUND OF THE INVENTION

The overall efficiency of the laser system is defined as the ratio of the output energy of the laser beam to the input energy of the pumping source.

To maximize the efficiency of an optically pumped laser such as flashlamp pumped solid state or dye laser a laser pumping cavity is used.

The pumping cavity concentrates the light output from the pump source onto the laser material. In addition, in order to achieve a uniform illumination of the lasing material and to eliminate "hot" regions in the laser beam it has been found desirable to surround the pumping cavity with a diffuse-reflector surface. The diffuse-reflective pump cavity surface layer, usually a compressed barium sulfate powder, has been used for the generation of high energy, uniform intensity laser beams in solid state as well as dye laser systems.

Ideally, one would like a large overlap of the pump emitted radiation and the absorption bands of the lasing material. In this way the thermal load and the thermally induced optical distortions in the laser material are minimal. In addition, it is desirable to reduce the ultra-violet Portion of the pump radiation since it may cause solarization of the laser material and deterioration of the organic liquid coolant used for cooling the pump cavity. However, for most conventional pump sources and lasing materials the aforementioned overlap is small A method used in the prior art for increasing the matching between the emission spectrum of the pumping source and the excitation spectrum of the lasing material is based on the use of fluorescent materials dissolved in the liquid coolant used for cooling the pump cavity, see for example U.S. Pat. No. 4,445,217. However, such fluorescent materials—usually of organic nature—are gradually destroyed as a result of the exposure to ultra-violet radiation and degradation in performance results.

SUMMARY OF THE INVENTION

It is an object of this invention to provide a diffuse-reflective laser pumping cavity which has the properties of converting light of an undesired wavelength to a desired longer one which also in addition increases the spectral overlap between the pump source and the laser material with no degradation in performance with time. In particular such a cavity converts the undesired ultra-violet(UV) radiation, which is a significant fraction of the pump spectrum into useful longer wavelength radiation, thereby increasing the energy output of the laser or of the laser amplifier.

According to the invention, the laser pumping cavity comprises a fluorescent diffuse - reflective layer surrounding the laser material or located adjacent to same and the pump source. The fluorescent diffuse-reflective layer comprises a fluorescent powder or is made of a solid fluorescent material. If a fluorescent powder is used, the powder is confined between an internal transparent tube and an external enclosure.

According to the invention there is used an inorganic fluorescent material which performs the function of a diffuse-reflector like the barium sulfate-powder and at the same time increases the spectral matching between pump spectrum and the excitation spectrum of the lasing material. A number of non-organic fluorescent diffuse-reflective materials can be found for efficient optical pumping of lasers. As an example, YITTRIUM ALUMINATE:CERIUM ($Y_3Al_5O_{12}$:Ce) used in the preferred embodiment of the invention absorbs UV radiation from 200 NM to 400 NM and emits fluorescent radiation between 500 NM and 700 NM with a peak at 556 NM. The fluorescent decay life-tine of this material is $6.0 \times 10^{-8}$ sec.

Another diffusely-reflecting material which fluoresces at 482 NM and 578 NM and can be used in the Nd:YAG laser system is YTTRIUM VANADATE:-VANADATE:DYSPROSIUM ($YVO_4/\overline{V}$:Dy*). The fluorescent line width of this material is narrower than that of YTTRIUM ALUMINATE: CERIUM.

When selecting the fluorescent material for use in a pulsed laser one has to take into account the decay life-time of the fluorescent band of the material.

As an example, LITHIUM METAALUMINATE:IRON ($Li_2Al_2O_4$:Fe) converts UV radiation to infraRed radiation at 743 NM, but the fluorescent lifetime of this material is $1.4 \times 10^{-2}$ sec., which is too long for efficiently pumping pulsed Nd:YAG lasers.

DETAILED DESCRIPTION OF THE PREFERRED EMBODIMENT

Figure 1:
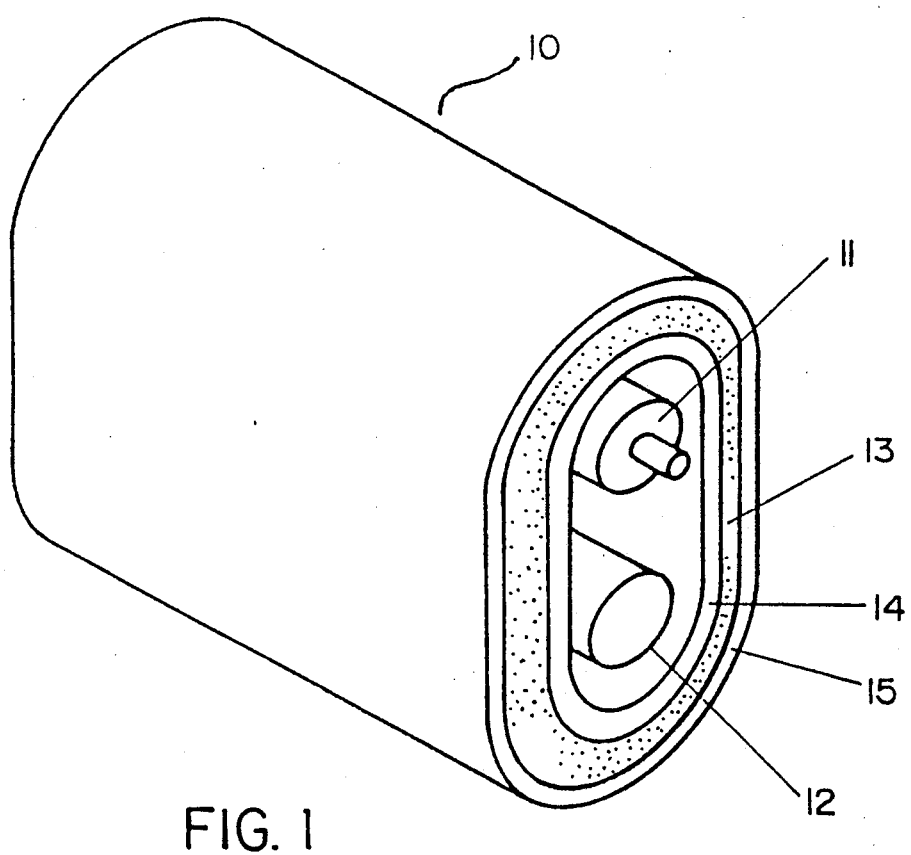
FIG. 1: is a schematic illustration of an optical pumping cavity of a laser according to one embodiment of the invention.
Figure 2:
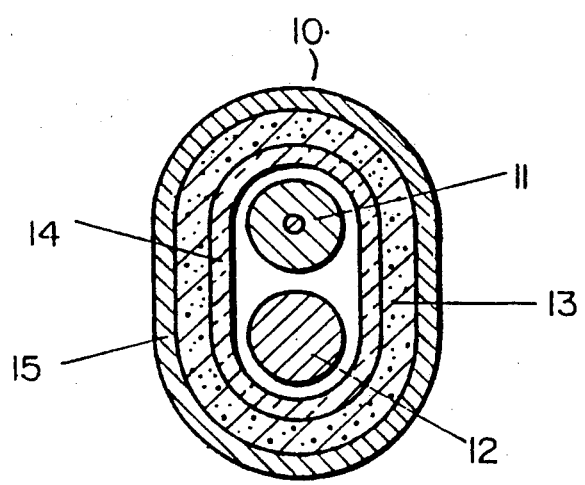
FIG. 2: is a cross-sectional view of the pumping cavity of FIG. 1.

FIG. 1 and FIG. 2 illustrate an optical pumping cavity 10 of a solid state laser. The pumping cavity 10 has an oval cross-section and comprises a flash lamp 11 used as the pumping source within the cavity 10. Parallel to the flashlamp 11 in the cavity 10 is disposed a solid state rod 12 of a laser material such as Nd:YAG.

The flashlamp 11 and the rod 12 are supported at the end of the cavity by drilled end plates (not shown). The flashlamp 11 and the rod 12 are surrounded by a diffuse-reflective layer consisting of a compressed fluorescent powder 13 such as YTTRIUM ALUMINATE:-CERIUM ($Y_3Al_5O_{12}$:Ce) or YTTRIUM VANADATE:VANADATE:DYSPROSIUM. The powder 13 is compressed between a transparent internal tube 14 and an external enclosure 15.

Figure 3:
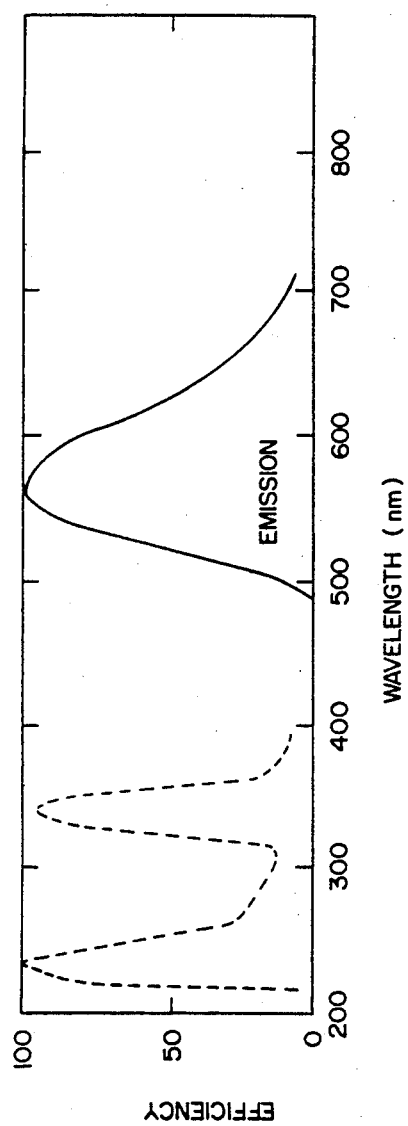
FIG. 3: Illustration of excitation and emission spectra of YTTRIUM ALUMINATE:CERIUM fluorescent powder used in pumping cavities according to the invention.
Figure 4:
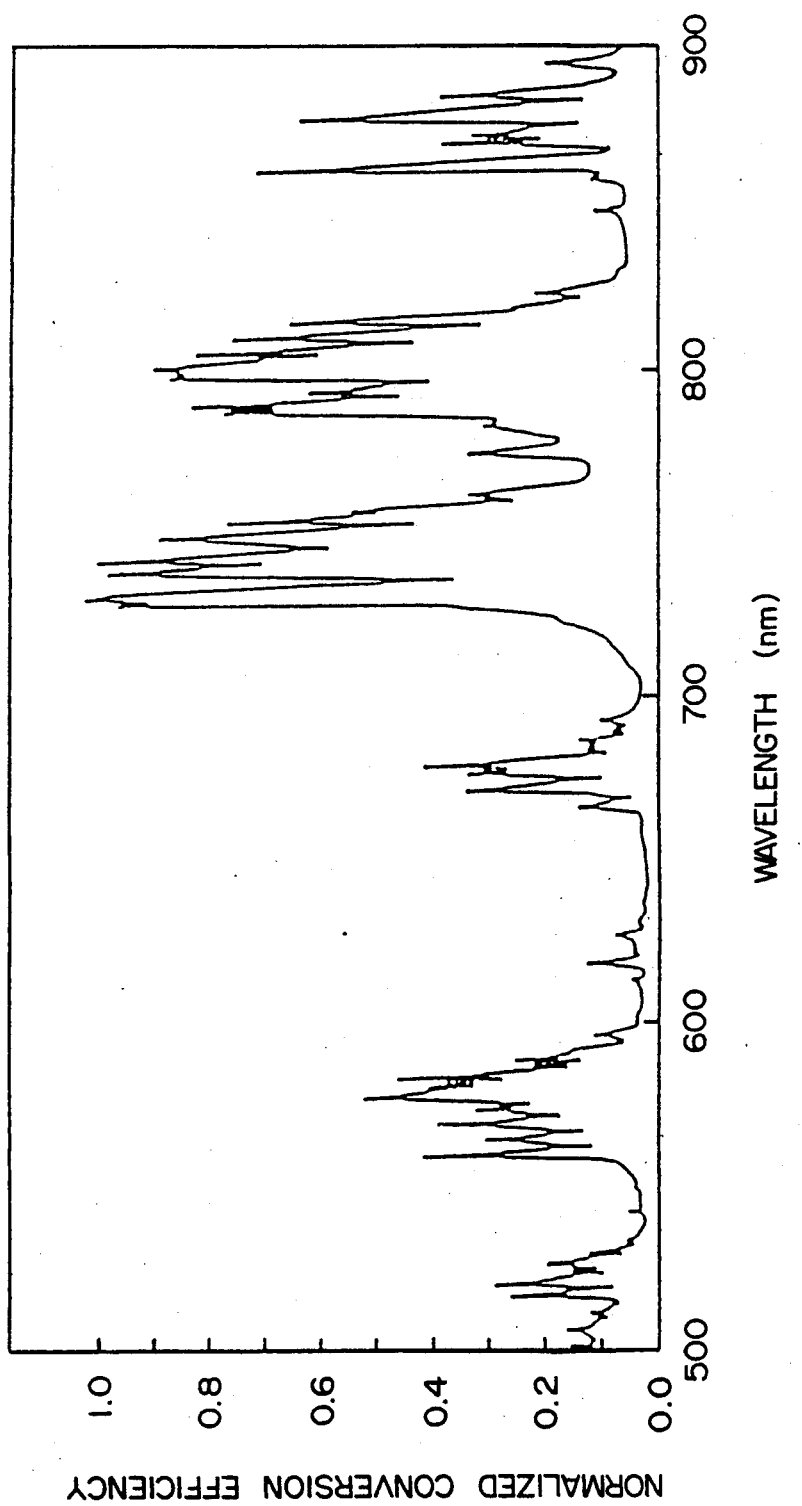
FIG. 4: Excitation spectrum of Nd:YAG laser material.

FIG. 3 illustrates the excitation and emission spectra of the fluorescent powder 13 such as YTTRIUM ALUMINATE:CERIUM. The flashlamp 11, filled with xenon, emits radiation in a wide spectral range. Most of the radiation is emitted in the UV range and is not directly useful for pumping the rod 12. The fluorescent powder 13 absorbs the UV radiation up to 400 NM and emits a fluorescent radiation between 500 to 700 NM. This radiation is absorbed by the Nd:YAG laser rod 12 as is illustrated in FIG. 4 and as a result, it improves laser rod pumping.

Since fluorescent powder 13 absorbs only the UV radiation, the radiation for which the powder particles are transparent will be refracted or reflected and eventually will scatter out of the powder. Thus, the fluorescent powder 13 serves as a diffuse-reflective surface for longer wavelength radiation emitted by the flashlamp 11 and at the same time absorbs the UV part of the spectrum and transforms it into a useful part of the pumping radiation.

Figure 5:
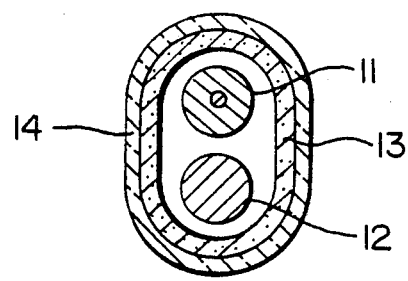
FIG. 5: is a cross-sectional view of a pumping cavity similar to that of FIG. 2, illustrating a second embodiment of the invention.

Another embodiment of the invention is illustrated in FIG. 5. The difference in the embodiments is the fluorescent powder 13 coating on the inner surface of a tube 15.

Figure 6:
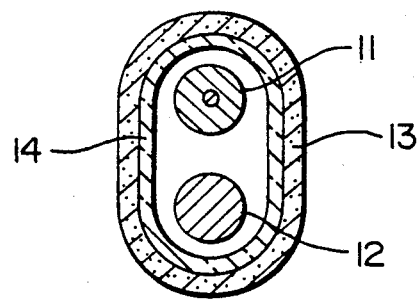
FIG. 6: is a cross-sectional view of a pumping cavity similar to that of FIG. 2 illustrating a third embodiment of the invention.
Figure 7:
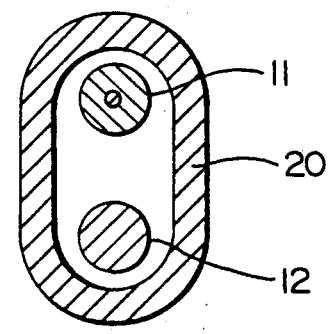
FIG. 7: is a cross-sectional view of a pumping cavity similar to that of FIG. 2, illustrating another embodiment of the invention.

A third embodiment of the invention is n FIG. 6. In the third embodiment, the fluorescent powder 13 is coated on the outer surface of a transparent tube such as fused quartz 14. A fourth embodiment of the invention is illustrated in FIG. 7. In this embodiment the diffuse-reflector is made of a fluorescent solid material 20.

A specific fabrication technique for the pumping cavity 10 is as follows:

The external enclosure 15 and the transparent internal tube 14 are positioned in a specially designed fixture. The fixture has a central pin and a surrounding outer housing. The housing holds the enclosure 15 in place, while the pin helps to keep the internal tube 14 centered. Small amounts of powder 13 are packed carefully between tube 14 and enclosure 15 using a long solid rod. After the packing is done, the powder 13 is sealed by gluing thin rings between tube 14 and the enclosure 15.

As an example, the Nd:YAG laser system using a close-coupled pumping cavity packed with YTTRIUM ALUMINATE:CERIUM, was 30% more efficient than the same pumping cavity packed with barium sulfate powder. This pumping cavity was operated for many millions of laser pulses and showed no degradation in performance with time.

Thus, in a laser pumping cavity according to the invention, a single element is employed which performs the function of diffuse-reflector and at the same time increases the matching between pump spectrum and the excitation spectrum of the lasing material.

It is obvious to a person skilled in the art that various changes can be made without departing from the scope of the invention and the invention is not to be considered limited to what is shown in the drawings or described in the specification.

I claim:

1. A laser pumping cavity comprising
a laser material,
a light source optically coupled to said laser material for the excitation of said laser material thus establishing an optical gain in said laser material of infrared, visible or ultraviolet waves,
a bi-functional fluorescent diffuse-reflector illuminated by said light source surrounding at least part of the laser pumping cavity, which diffuse reflector comprises crystallites of a fluorescent material, which crystallites reflect back into the laser pumping cavity radiation of a pumping wavelength, and which convert by fluorescence radiation outside the pumping wavelength into radiation of pumping wavelengths of said laser material, said fluorescent diffuse-reflector including a fluorescent powder.

2. A laser pumping cavity comprising
a laser material,
a light source optically coupled to said laser material for the excitation of said laser material thus establishing an optical gain in said laser material of infrared, visible or ultra-violet waves,
a bi-functional fluorescent diffuse-reflector illuminated by said light source surrounding at least part of the laser pumping cavity, which diffuse reflector comprises crystallites of a fluorescent material, which crystallites reflect back into the laser pumping cavity radiation of pumping wavelength, and which convert by fluorescence radiation outside the pumping wavelength into radiation of pumping wavelengths of said laser material,
the laser material being a solid rod, the light source being arranged parallel to said rod, and where the fluorescent-diffuse-reflector has an essentially tubular configuration, surrounding both the laser rod and the light source.

3. A laser pumping cavity comprising
a laser material,
a light source optically coupled to said laser material for the excitation of said laser material thus establishing an optical gain in said laser material of infrared, visible or ultra-violet waves,
a bi-functional fluorescent diffuse-reflector illuminated by said light source surrounding at least part of the laser pumping cavity, which diffuse reflector comprises crystallites of a fluorescent material, which crystallites reflect back into the laser pumping cavity radiation of pumping wavelength, and which convert by fluorescence radiation outside the pumping wavelength into radiation of pumping wavelengths of said laser material,
the laser material being an Nd:YAG laser and the fluorescent material being YITRIUM:VANADATE:VANADATE:DYSPROSIUM.

4. A laser pumping cavity comprising
a laser material,
a light source optically coupled to said laser material for the excitation of said laser material thus establishing an optical gain in said laser material of infrared, visible or ultra-violet waves,
a bi-functional fluorescent diffuse-reflector illuminated by said light source surrounding at least part of the laser pumping cavity, which diffuse reflector comprises crystallites of a fluorescent material, which crystallites reflect back into the laser pumping cavity radiation of pumping wavelength, and which convert by fluorescence radiation outside the pumping wavelength into radiation of pumping wavelengths of said laser material,
the fluorescent diffuse-reflector surrounding at least part of the laser material,
a fluorescent powder being compressed between an internal transparent tube and an external enclosure.

5. A laser pumping cavity comprising a laser material, a light source optically coupled to said laser material for the excitation of said laser material thus establishing an optical gain in said laser material of infrared, visible or ultraviolet waves, a bi-functional fluorescent diffuse-reflector illuminated by said light source surrounding at least part of the laser pumping cavity, which diffuse reflector comprises crystallites of a fluorescent material, which crystallites reflect back into the laser pumping cavity radiation of a pumping wavelength, and which convert by fluorescence radiation outside the pumping wavelength into radiation of pumping wavelengths of said laser material, the laser material being Nd:YAG and said fluorescent material being YTTRIUM ALUMINATE:CERIUM.

6. A laser pumping cavity comprising a laser material, a light source optically coupled to said laser material for the excitation of said laser material thus establishing an optical gain in said laser material of infrared, visible or ultraviolet waves, a bi-functional fluorescent diffuse-reflector illuminated by said light source surrounding at least part of the laser pumping cavity, which diffuse reflector comprises crystallites of a fluorescent material, which crystallites reflect back into the laser pumping cavity radiation of a pumping wavelength, and which convert by fluorescence radiation outside the pumping wavelength into radiation of pumping wavelengths of said laser material, said fluorescent material being coated on an inner surface of an enclosure.

7. A laser pumping cavity comprising a laser material, a light source optically coupled to said laser material for the excitation of said laser material thus establishing an optical gain in said laser material of infrared, visible or ultraviolet waves, a bi-functional fluorescent diffuse-reflector illuminated by said light source surrounding at least part of the laser pumping cavity, which diffuse reflector comprises crystallites of a fluorescent material, which crystallites reflect back into the laser pumping cavity radiation of a pumping wavelength, and which convert by fluorescence radiation outside the pumping wavelength into radiation of pumping wavelengths of said laser material, a fluorescent powder being coated on an outer surface of a transparent tube.

* * * * *